US008493614B2

(12) United States Patent
Marcu

(10) Patent No.: US 8,493,614 B2
(45) Date of Patent: Jul. 23, 2013

(54) METHODS AND SYSTEMS FOR CALIBRATING A SOURCE AND DESTINATION PAIR

(75) Inventor: Gabriel Marcu, San Jose, CA (US)

(73) Assignee: Apple Inc., Cupertino, CA (US)

( * ) Notice: Subject to any disclaimer, the term of this patent is extended or adjusted under 35 U.S.C. 154(b) by 824 days.

(21) Appl. No.: 12/317,827

(22) Filed: Dec. 29, 2008

(65) Prior Publication Data

US 2010/0165363 A1 Jul. 1, 2010

(51) Int. Cl.
*H04N 1/60* (2006.01)
*G06K 9/00* (2006.01)

(52) U.S. Cl.
USPC ............ 358/1.9; 358/518; 358/501; 358/515; 358/521; 358/2.1; 358/1.15; 358/1.16; 358/523

(58) Field of Classification Search
USPC .................. 358/1.9, 518, 501, 515, 521, 2.1, 358/1.15–1.16, 523
See application file for complete search history.

(56) References Cited

U.S. PATENT DOCUMENTS

| | | | | |
|---|---|---|---|---|
| 6,693,718 | B1 * | 2/2004 | Takaoka ........................ | 358/1.15 |
| 7,206,094 | B2 * | 4/2007 | Kumada et al. .............. | 358/1.16 |
| 7,969,478 | B1 * | 6/2011 | Chen et al. .................. | 348/223.1 |
| 2008/0062442 | A1 * | 3/2008 | Olson ............................ | 358/1.9 |
| 2008/0084570 | A1 * | 4/2008 | Cho et al. ...................... | 358/1.9 |

* cited by examiner

*Primary Examiner* — Steven Kau
*Assistant Examiner* — Quang N Vo
(74) *Attorney, Agent, or Firm* — Adeli & Tollen LLP

(57) ABSTRACT

At least certain embodiments of the disclosures relate to methods and data processing systems for matching a source profile to a destination profile. In one embodiment, a method includes providing a destination test chart and a corresponding first source test chart with each test chart having color patches. The method includes adjusting the source profile to substantially match a known or an unknown destination profile in response to receiving an input for visually matching an adjustable white color patch of the first source test chart to a corresponding white color patch of the destination test chart. The method includes progressively generating a second source test chart having modified at least some and possibly all color patches compared to the first displayed test chart based on applying a first transformation to the source profile in response to visually matching the white color patch.

20 Claims, 12 Drawing Sheets
(4 of 12 Drawing Sheet(s) Filed in Color)

METHODS AND SYSTEMS FOR CALIBRATING A SOURCE AND DESTINATION PAIR

FIELD OF THE DISCLOSURE

Embodiments of the present disclosure generally relate to matching a color source device to a color destination device.

BACKGROUND OF THE DISCLOSURE

Electronic devices, such as computer systems or wireless cellular telephones or other data processing systems, may often include a display or display device for providing a user interface with various images, programs, menus, documents, and other types of information. The display of an electronic device may need to be calibrated in order to better match colors between the display and other types of media including other displays, paper sources, etc.

Most of the "What You See Is What You Get" methods of color matching are not successful due to the limitations between the gamut of a display and the gamut of a printer. These methods implicitly assume that the color management will do the perfect job of matching between a display and a printer. If this match fails, a user is abruptly left without a solution other than to improve the matching through a complicated process. This complicated process involves measurements and rebuilding the display or printer profile using a specialized software. A user may need color science experience to perform this complicated process.

Additionally, due to the variation of the ambient illumination and the observation conditions, the color on a screen may be perceived differently from one viewing condition to another. For example, a gray color may be perceived to be neutral (without color cast) in an office environment but pinkish in the daylight ambient illumination. A more complex situation may arise in the presence of mixed illuminants, for example when the fluorescent light in an office is mixed with the daylight coming through the windows. The viewing condition of a portable computer may change frequently, since the portable computer may be frequently moved to various locations of different environment conditions.

SUMMARY OF THE DISCLOSURE

At least certain embodiments of the disclosures relate to methods and data processing systems for matching a source profile to a destination profile. In one embodiment, a method includes providing a destination test chart and a corresponding first source test chart with each test chart having one or more corresponding color patches. Next, the method includes adjusting the source profile to substantially match a known or an unknown destination profile in response to visually matching an adjustable white color patch of the first source test chart to a corresponding white color patch of the destination test chart. Next, the method includes progressively generating a second source test chart having modified at least some and possibly all color patches compared to the first displayed test chart based on applying a first transformation to the source profile in response to visually matching the white color patch.

In at least certain embodiments, a data processing system includes a processor coupled to a bus, a display coupled to the bus, and a memory coupled to the bus. The memory may be configured to store one or more programs and configured to store a display profile associated with the display and a first displayed test chart with color patches. The processor may be configured to send a command to a printer to print the first displayed test chart to form a printed test chart, to receive an input to adjust the display profile to substantially match a printer profile in response to visually matching an adjustable white color patch of the first displayed test chart to at least one corresponding white color patch of the printed test chart, and progressively generate a second displayed test chart having modified color patches compared to the first displayed test chart based on applying a first transformation to the display profile in response to visually matching the white color patch.

Machine readable media, which contain executable instructions to cause a machine to operate as described herein, are also described.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure is illustrated by way of example and not limitation in the figures of the accompanying drawings in which like references indicate similar elements.

DETAILED DESCRIPTION

Figure 1:
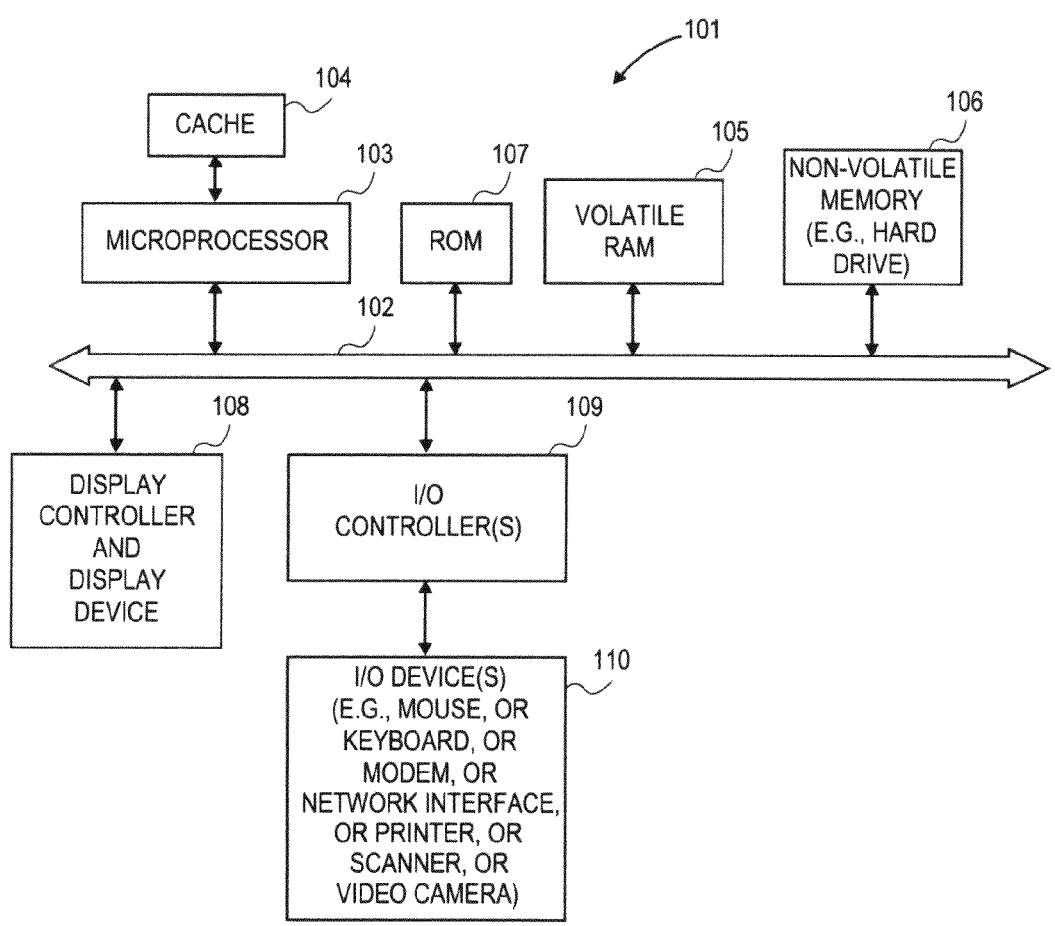
FIG. 1 shows an example of a data processing system with a display device in accordance with at least certain embodiments of the disclosures described herein.

At least certain embodiments of the disclosures relate to methods and data processing systems for calibrating a source and destination pair by matching a source profile to a destination profile. The term matching a source profile to a destination profile should be understood as providing a set of adjustments to the source profile such that the images produced by using the source profile with the adjustments match the images produced by using the destination profile. In one embodiment, a method includes providing a destination test chart and a corresponding first source test chart with each test chart having one or more corresponding color patches. Next, the method includes adjusting the source profile to substantially match a known or an unknown destination profile in response to visually matching an adjustable white color patch of the first source test chart to a corresponding white color patch of the destination test chart. Next, the method includes progressively generating a second source test chart having modified at least some and possibly all color patches compared to the first displayed test chart based on applying a first transformation to the source profile in response to visually matching the white color patch.

The source profile is adjusted to match the destination profile based on adjustments to source test charts that compensate for differences between source and destination calibrations and differences in color induced by one or more viewing conditions. Adjusting the source profile to substantially match the destination profile occurs without an instrument in substantially any viewing condition (e.g., ambient lighting condition).

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a through understanding of various embodiments of the present disclosure. However, in certain instances, well-known or conventional details are not described in order to provide a concise discussion of embodiments of the present disclosures.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present disclosure can relate to an apparatus for performing one or more of the operations described herein. This apparatus may be specially constructed for required purposes, or it may comprise a general purpose computer selectively activated or reconfigured by a computer program stored in the computer. Such a computer program may include instructions for performing the operations described herein and may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices, etc.

FIG. 1 shows an example of a data processing system with a display device in accordance with at least certain embodiments of the disclosures described herein. FIG. 1 shows one example of a typical computer system which may be used with the present disclosure. Note that while FIG. 1 illustrates various components of a computer system, it is not intended to represent any particular architecture or manner of interconnecting the components as such details are not germane to the present disclosure. It will also be appreciated that personal digital assistants (PDAs), handheld computers, cellular telephones, media players (e.g., an iPod), devices which combine aspects or functions of these devices (e.g., a media player combined with a PDA and a cellular telephone in one device), an embedded processing device within another device, network computers and other data processing systems which have fewer components or perhaps more components may also be used to implement one or more embodiments of the present disclosure. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be, for example, a microprocessor from Intel or a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device(s) 108, which may include display devices and corresponding frame buffers, and to peripheral devices such as input/output (I/O) devices which may be mice, keyboards, modems, network interfaces, printers, scanners, video cameras and other devices which are well known in the art. The display controller 108 may include one or more frame buffers which are used to refresh multiple display devices or the frame buffers may be in a system RAM (e.g., RAM 105). Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present disclosure may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals, and/or an IEEE-1394 bus adapter for controlling IEEE-1394 peripherals.

It will be apparent from this description that aspects of the present disclosure may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present disclosure. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present disclosure seeks to describe a data processing system 101 that includes a microprocessor or processor 103 coupled to a bus 102. The data processing system 101 further includes a display or display device 108 coupled to the bus 102. A memory block such as ROM 107, RAM 105, or nonvolatile memory 106 is coupled to the bus 102 with the memory block being configured to store one or more programs and configured to store a display profile associated with the display and a first displayed test chart with one or more sequences of predefined and custom color patches. The processor 103 is configured to send a command to a printer to print the first displayed test chart to form a printed test chart. The processor 103 is configured to receive an input to adjust the display profile to substantially match a known or an unknown printer profile in response to visually matching at least one predefined color patch or custom color patch of the first displayed test chart to at least one corresponding predefined color patch or custom color patch of the printed test chart and to derive a link profile between the adjusted display profile and the printer profile. Adjusting the display profile to substantially match the known or unknown printer profile occurs without an instrument in substantially any ambient lighting condition.

In one embodiment, the processor 103 is further configured to receive an input indicating a visual matching of an adjustable white color patch of the display to a white color patch of the printed test chart and to progressively generate a second displayed test chart having modified at least some and possibly all predefined color patches compared to the first displayed test chart based on applying a first transformation to the display profile in response to visually matching the white color patch.

In another embodiment, the processor 103 is further configured to receive an input indicating a visual matching of an adjustable black color patch of the display to a black color patch of the printed test chart and to progressively generate a third displayed test chart having modified at least some and possibly all predefined color patches, except for white patches, compared to the second displayed test chart based on applying a second transformation to the display profile in response to visually matching the black color patch.

In another embodiment, the processor 103 is further configured to receive an input indicating a visual selecting of a displayed gray patch of a sequence of gray patches of the third displayed test chart with a greatest visual mismatch in comparison to a corresponding sequence of gray patches of the printed test chart. The processor 103 also generates a reference gray level that is between the selected displayed gray patch and the corresponding selected gray patch of the printed test chart having the greatest visual mismatch and progressively generates a fourth source test chart having modified at least some and possibly all predefined color patches, except for white and black patches, compared to the third displayed test chart based on applying a fourth transformation to the display profile for values greater than the reference gray level and a fifth transformation for values less than the reference gray level.

Figure 2A:
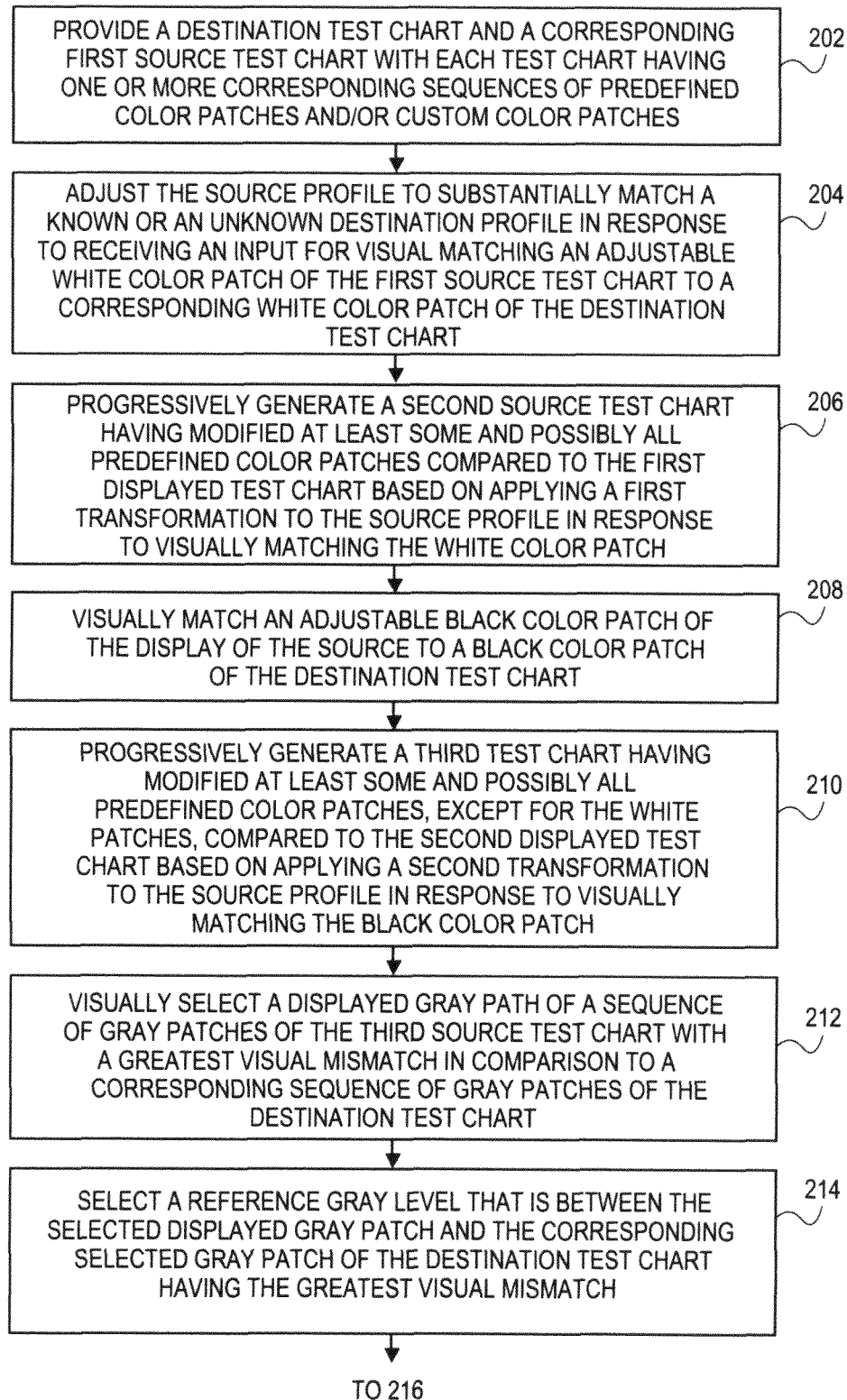
FIGS. 2A, 2B and 2C are flow charts of an embodiment of a method of the disclosures described herein.
Figure 2B:
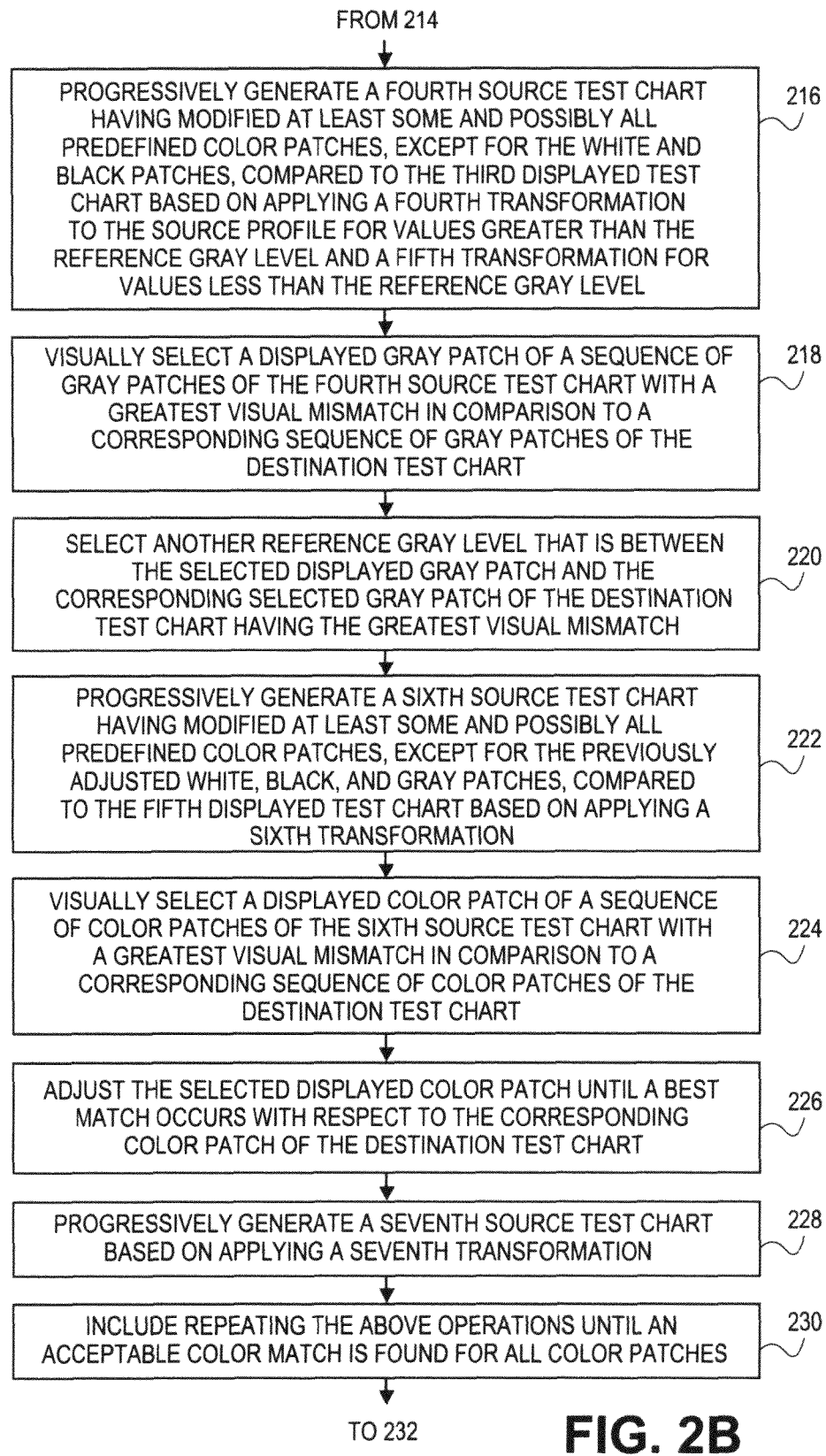
Figure 2C:
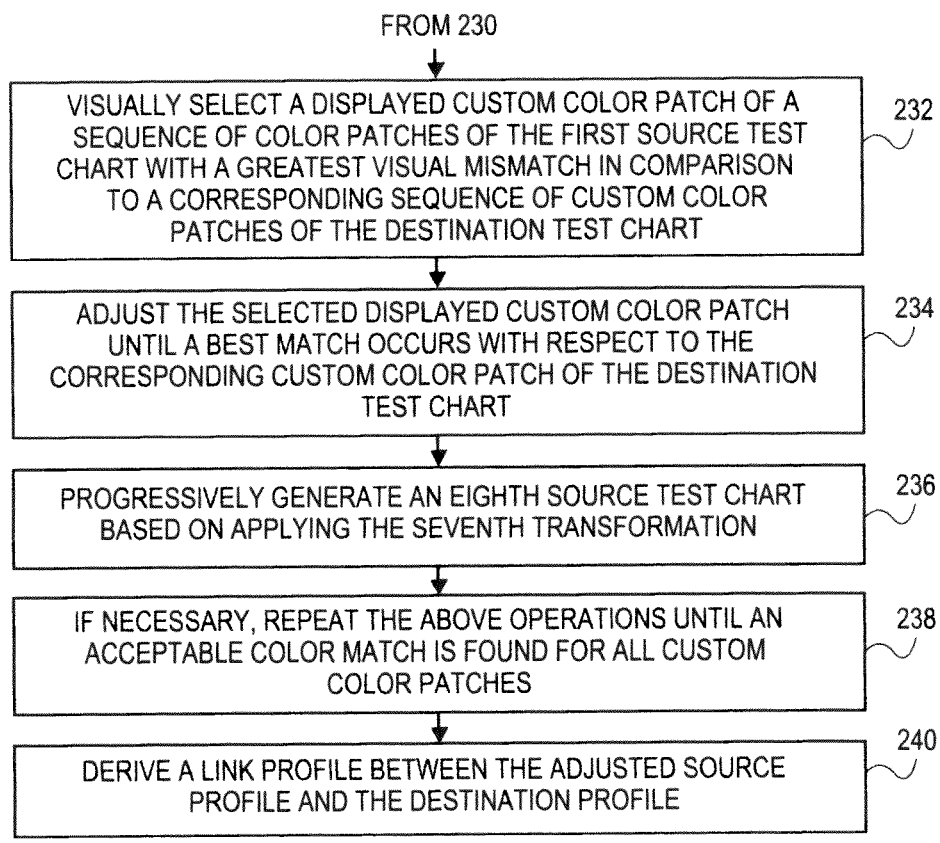

FIGS. 2A, 2B and 2C are flow charts of an embodiment of a method for matching a source profile to a destination profile. The method includes providing a destination test chart and a corresponding first source test chart with each test chart having one or more corresponding sequences of predefined color patches and/or custom color patches at block 202. Next, the method includes adjusting the source profile to substantially match a known or an unknown destination profile in response to receiving an input for visually matching an adjustable white color patch of the first source test chart to a corresponding white color patch of the destination test chart at block 204. Next, the method includes progressively generating a second source test chart having modified at least some and possibly all predefined color patches compared to the first displayed test chart based on applying a first transformation to the source profile in response to visually matching the white color patch at block 206. Next, the method includes visually matching an adjustable black color patch of the display of the source to a black color patch of the destination test chart at block 208. Next, the method includes progressively generating a third source test chart having modified at least some and possibly all predefined color patches, except for the white patches, compared to the second displayed test chart based on applying a second transformation to the source profile in response to visually matching the black color patch at block 210.

Next, the method includes visually selecting a displayed gray patch of a sequence of gray patches of the third source test chart with a greatest visual mismatch in comparison to a corresponding sequence of gray patches of the destination test chart at block 212. Next, the method includes selecting a reference gray level that is between the selected displayed gray patch and the corresponding selected gray patch of the destination test chart having the greatest visual mismatch at block 214. In one embodiment, the reference gray level is set at a middle level between the selected displayed gray patch and the selected gray patch of the destination test chart. Next, the method includes progressively generating a fourth source test chart having modified at least some and possibly all predefined color patches, except for the white and black patches, compared to the third displayed test chart based on applying a fourth transformation to the source profile for values greater than the reference gray level and a fifth transformation for values less than the reference gray level at block 216.

Next, the method includes visually selecting a displayed gray patch of a sequence of gray patches of the fourth source test chart with a greatest visual mismatch in comparison to a corresponding sequence of gray patches of the destination test chart at block 218. Next, the method includes selecting another reference gray level that is between the selected displayed gray patch and the corresponding selected gray patch of the destination test chart having the greatest visual mismatch at block 220. Next, the method includes progressively generating a sixth source test chart having modified at least some and possibly all predefined color patches, except for the previously adjusted white, black, and gray patches, compared to the fifth displayed test chart based on applying a sixth transformation at block 222.

Next, the method includes visually selecting a displayed color patch of a sequence of color patches of the sixth source test chart with a greatest visual mismatch in comparison to a corresponding sequence of color patches of the destination test chart at block 224. Next, the method includes adjusting the selected displayed color patch until a best match occurs with respect to the corresponding color patch of the destination test chart at block 226. Next, the method includes progressively generating a seventh source test chart based on applying a seventh transformation at block 228. Next, the method includes repeating the above operations until an acceptable color match is found for all color patches at block 230.

Next, the method includes visually selecting a displayed custom color patch of a sequence of color patches of the first source test chart with a greatest visual mismatch in comparison to a corresponding sequence of custom color patches of the destination test chart at block 232. Next, the method includes adjusting the selected displayed custom color patch until a best match occurs with respect to the corresponding custom color patch of the destination test chart at block 234. Next, the method includes progressively generating an eighth source test chart based on applying the seventh transformation at block 236. Next, the method includes if necessary repeating the above operations until an acceptable color match is found for all custom color patches at block 238. In one embodiment, the eighth source test chart is a custom color chart for adjusting the destination profile and source profile with respect to a specific target image having a set of predefined color patches and a set of custom color patches.

Next, the method includes deriving a link profile, which represents an equivalency between destination color and source color, between the adjusted source profile and the destination profile at block 240. Deriving the link profile between the adjusted source profile and the destination profile is based on the above described adjustments to the source test charts that compensates for differences between source and destination calibrations and differences in color induced by one or more viewing conditions.

In some embodiments, this method achieves a color match between destination printed colors and the displayed source colors for a specific source (e.g., display) and destination (e.g., printer) by changing the displayed image, without the use of any color measuring instrument using a minimum number of visual color match operations between printed and displayed color patches. This method may also be used for obtaining a color match between a printed image and the displayed image for a specific target image.

A correct printer and display calibration will ease the task of matching. However, this condition is not necessary for the proposed procedure. The method assumes no display or printer calibration, nor particular printing application. The printed page is viewed in the ambient illumination, which may not be the ideal viewing environment for viewing the print.

In one embodiment, a printer and display have previously been calibrated. Any color differences between the printer and display are likely attributed to an illuminant. The white and black matching operations discussed above may be sufficient to account for these color difference without needing any other adjustments. In another embodiment, the printer and display have not been previously calibrated. Any color differences between the printer and display are likely attributed to an illuminant and/or lack of calibration. The white, black, and gray matching operations discussed above may be sufficient to account for these color difference without needing any other adjustments. Alternatively, additional color matching operations may be necessary to eliminate color differences between the printer and display.

Figure 3:
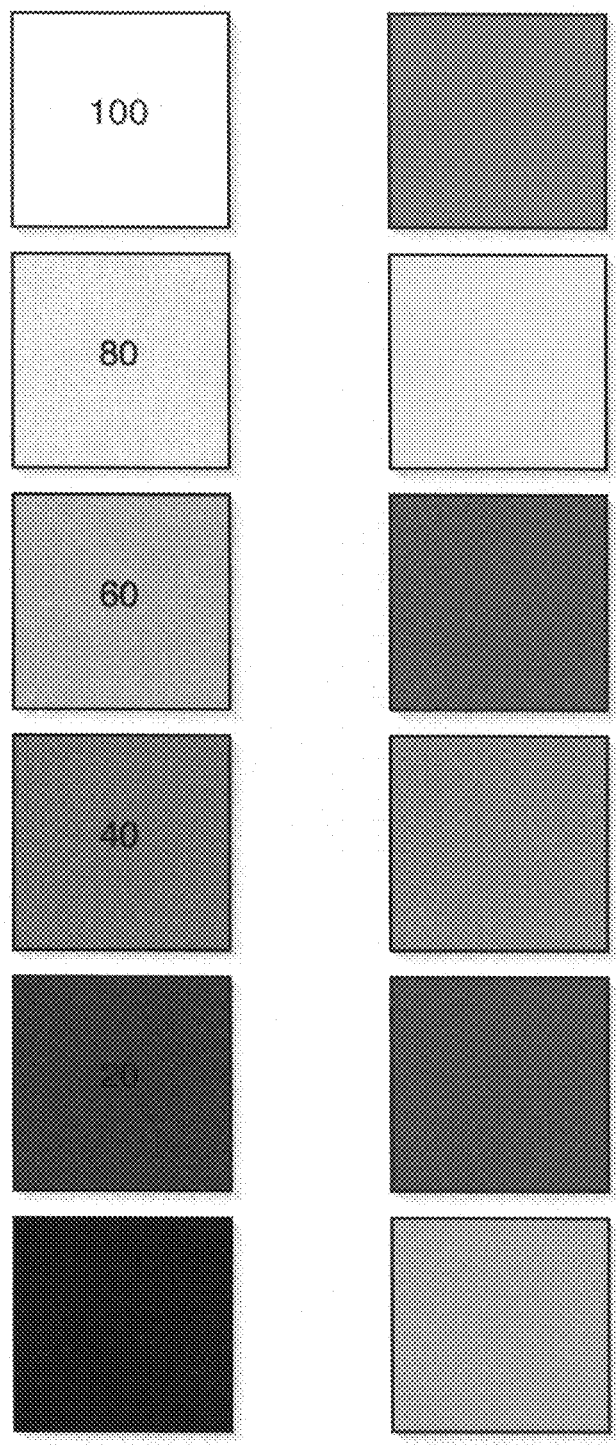
FIGS. 3 and 4 illustrate a test target (e.g., destination or printed test chart) that contains a predefined color patch set in accordance with one embodiment of the disclosures described herein.
Figure 4:
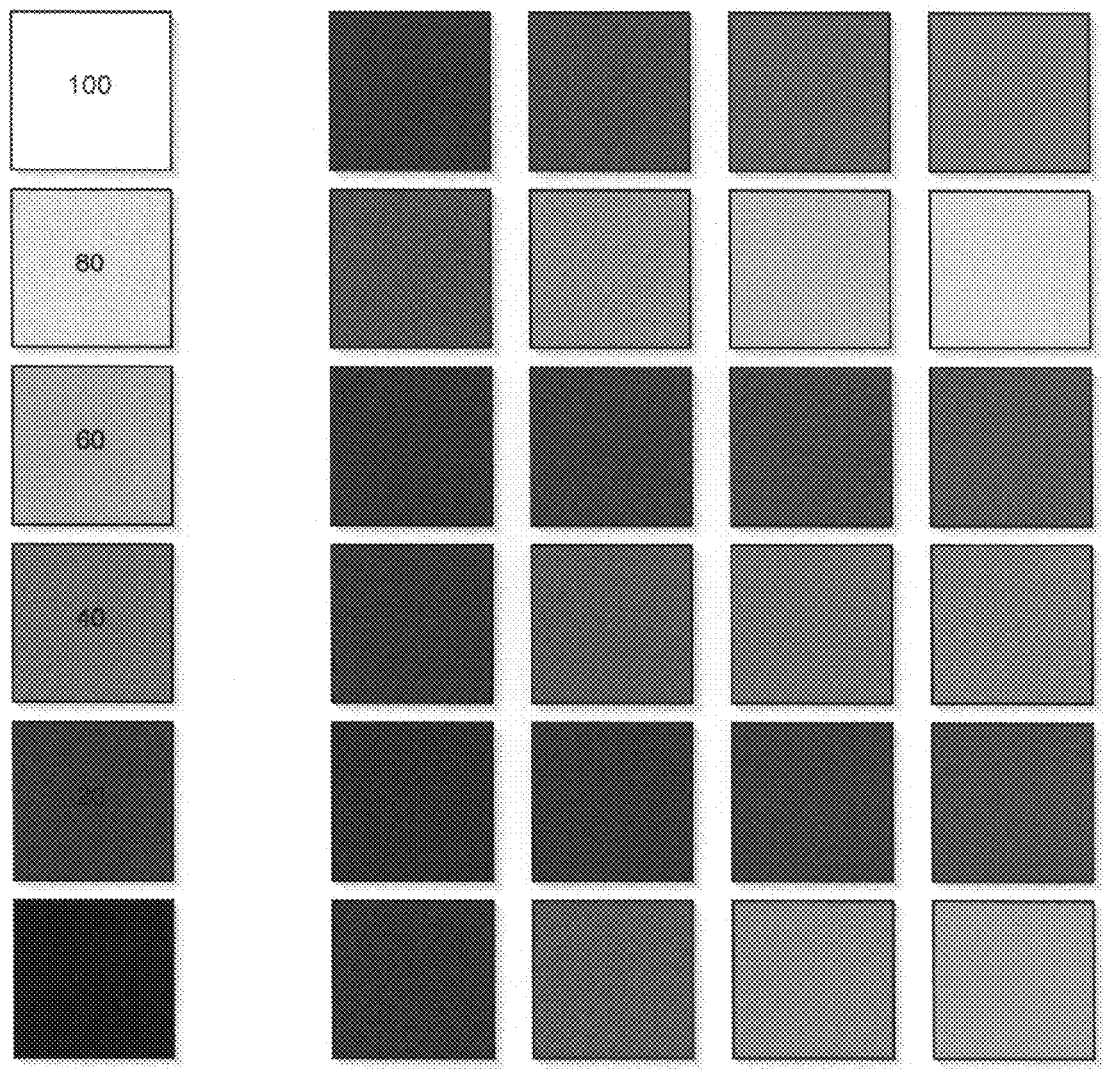

A test target (e.g., destination or printed test chart) is generated by the above method and contains a predefined color patch set with white, black, grays, cyan, magenta, yellow, red, green, and blue colors as illustrated in FIGS. 3 and 4 in accordance with one embodiment.

Figure 5:
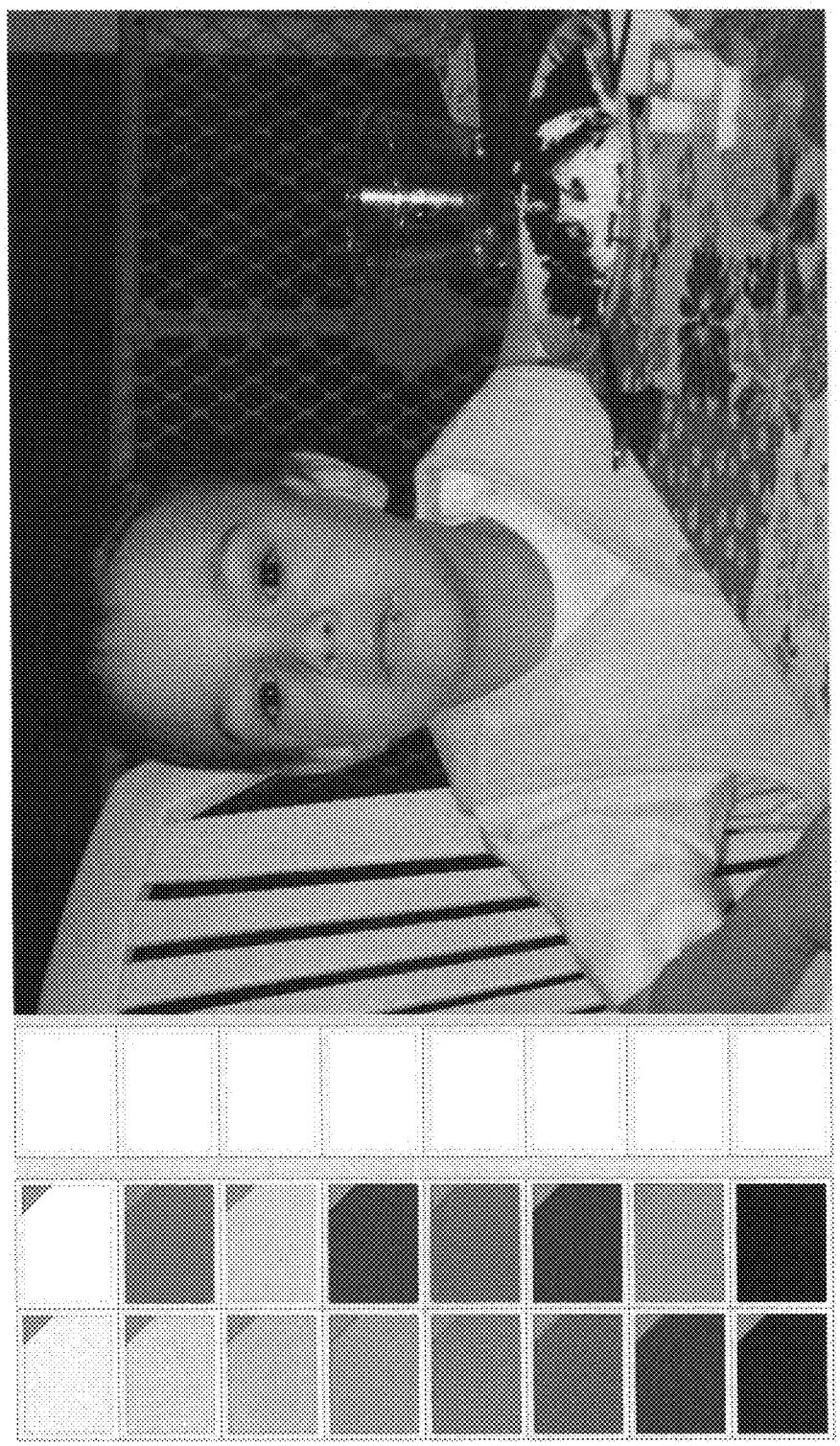
FIG. 5 illustrates a target image and predefined color patch set having various colors in accordance with one embodiment of the disclosures described herein.

FIG. 5 illustrates a target image and a predefined color patch set having various colors in accordance with one embodiment of the disclosures described herein. The predefined color patch set is used in accordance with the above method(s) to color match a display of the target image (e.g., a boy eating cake) to a printed copy of the target image.

Figure 6:
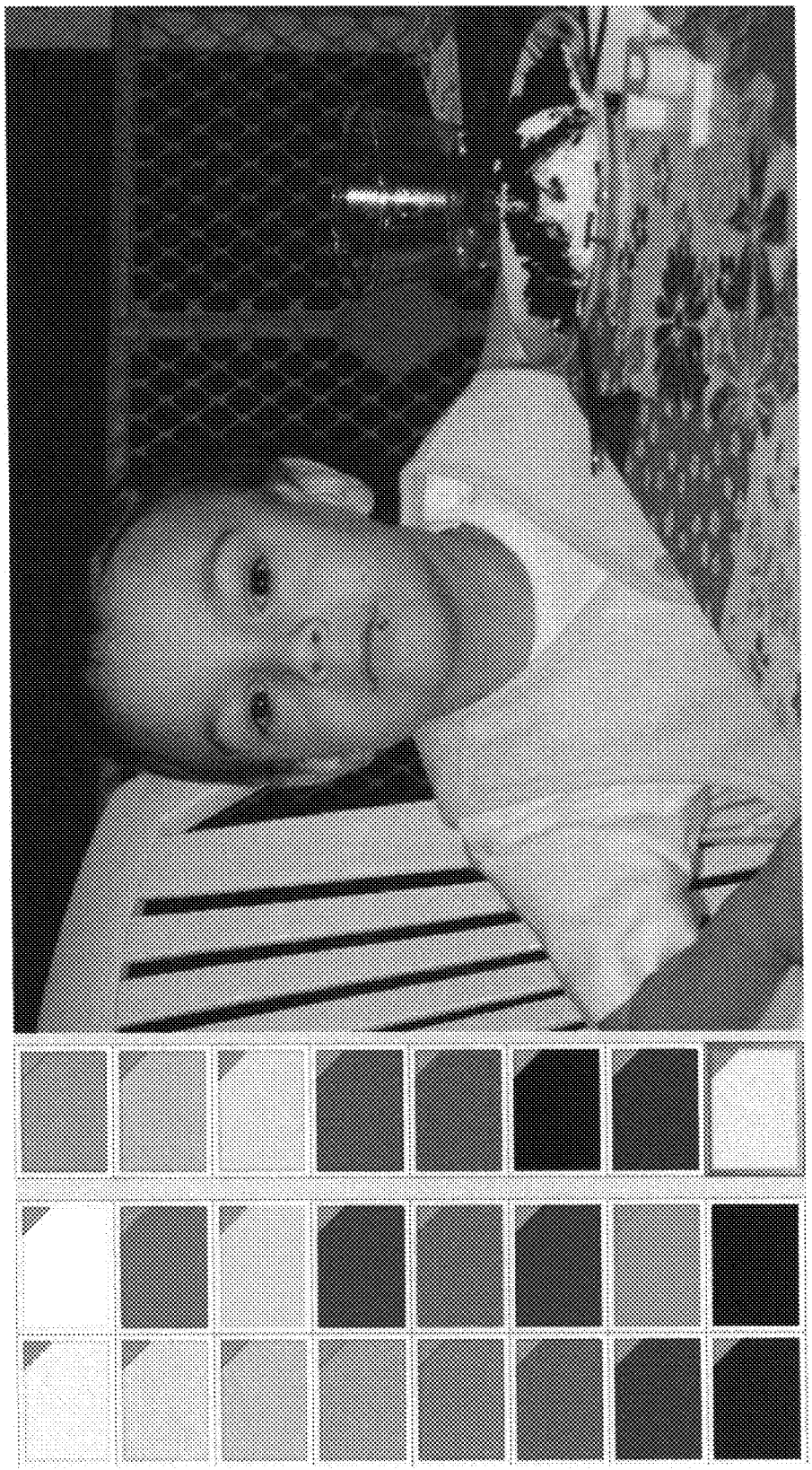
FIG. 6 illustrates a target image and color patch set having predefined color patches and custom color patches that are determined from the target image in accordance with one embodiment of the disclosures described herein.

FIG. 6 illustrates a target image and a color patch set having predefined color patches and custom color patches that are determined from the target image in accordance with one embodiment of the disclosures described herein. The custom color patches may be spot colors such as logo colors, or the most representative colors in the target image that can be computed by an apriori method such as quantization. The custom patches are not necessary for the proposed procedure, but may be helpful for achieving a more precise color match for the specific target image. The color patch sets and target image is displayed on the screen and it is printed on the paper. The predefined color patch set and custom color patch set are used in accordance with the above method(s) to color match a display of the target image (e.g., a boy eating cake) to a printed copy of the target image. A software program can automatically select the custom color patch based on colors found in the target image. Alternatively, a user can manually select the custom color patch based on colors found in the target image.

In certain embodiments, the method described above can be implemented in a specific manner. First, the test target image is printed. The printed color patches are compared with the displayed colors patches for color differences. If a mismatch is observed in the printed color patches, the following adjustment procedure should be used for improving the color match. The adjustment procedure consists of a sequence of visual color matches that progresses from a single patch color match, to two patches, three patches, etc. verifying at each operation if more operations of color matching are required, until a satisfactory result is achieved. At each operation, the displayed color is adjusted for a color match.

For a white patch matching operation (e.g., block 204), the white of the screen is visually matched with the white of the paper by varying the displayed white color. If the match of the displayed white patch with the match of the paper white cannot be produced, then more suitable viewing conditions should be found.

If $C_w$ denotes the white of the screen that has been visually adjusted to the new value $C_w^t$, then the new colors of the displayed target image will be computed using the following transformation (e.g., first transformation of block 206):

$$C^t = \frac{C_w^t}{C_w} C$$

This transformation will affect all colors in the displayed image.

For a black patch matching operation (e.g., block 208), the black of the screen is visually matched with the black of the paper. If a match between the blacks cannot be achieved because the black of the paper is darker than the black of the screen, then the procedure should be continued leaving the black of the screen at the deepest black of the display device. If $C_k$ denotes the black of the screen that has been adjusted to the new value $C_k^t$, then the new colors of the displayed target image will be computed using the following transformation (e.g., second transformation of block 210):

$$C^t = \frac{C_w^t - C_k^t}{C_w - C_k} \cdot (C - C_k) + C_k^t$$

After this operation, if the following conditions are fulfilled a good chance of a match of any test target image may be achieved if the display and printer are calibrated, their profiles are correctly used, the rendering intent is correctly selected, and the printing application is using the correct color matching. This is due to the fact that the white and black defining the two media (display and print) are matching. This ensures that most of the differences due to the viewing conditions are compensated.

The following operations may be required in case of calibrated source and destination devices due to the differences induced by the illuminant power spectra distributions different from a standard illuminant that is assumed by the color management process or other factors affecting the metameric matches between the display and print. In case of uncalibrated source and destination devices, the color differences seen after the adjustment of white and black colors may be due to the other factors (differences in tone reproduction curves primaries, color reproduction technologies, etc.). In this case, more of the following steps are required for producing the match.

For the following operations, we will assume that the color C of the displayed image has been already transformed according to the white and black matching operations discussed above. The transformed values will be denoted by $C^t$. The transformed white and black values will be denoted by $C_1^t = 1$, $C_0^t = 0$ respectively.

Gray patch matching operations (e.g., blocks 212-222) achieve a match of the gray patches of the test chart. The gray patches are labeled K1, . . . , Kn, corresponding to a number of gray patches that are adjusted. If after one of the Kn operations a match of the all the gray patches is achieved, and the match of the color patches is not achieved, the procedure can move directly to the match of color patches, operation Cn.

For a gray patch K1, a user visually selects the displayed gray patch that has the highest mismatch with the corresponding printed patch. Let that gray level be K1. Next, the middle of the gray level (patch K1) is matched between the display and the print. The K1 displayed gray level will be transformed as follows:

$$C_{k1} \to C_{k1}^t$$

The colors of the displayed image will be transformed (e.g., fourth and fifth transformations of block 216) as follows:

$$C^t = \frac{1 - C_{k1}^t}{1 - C_{k1}} \cdot (C - C_{k1}) + C_{k1}^t, \text{ for values larger than } K1, \text{ and}$$

$$C^t = \frac{C_{k1}^t}{C_{k1}} C, \text{ for values smaller than } K1.$$

Figure 7:
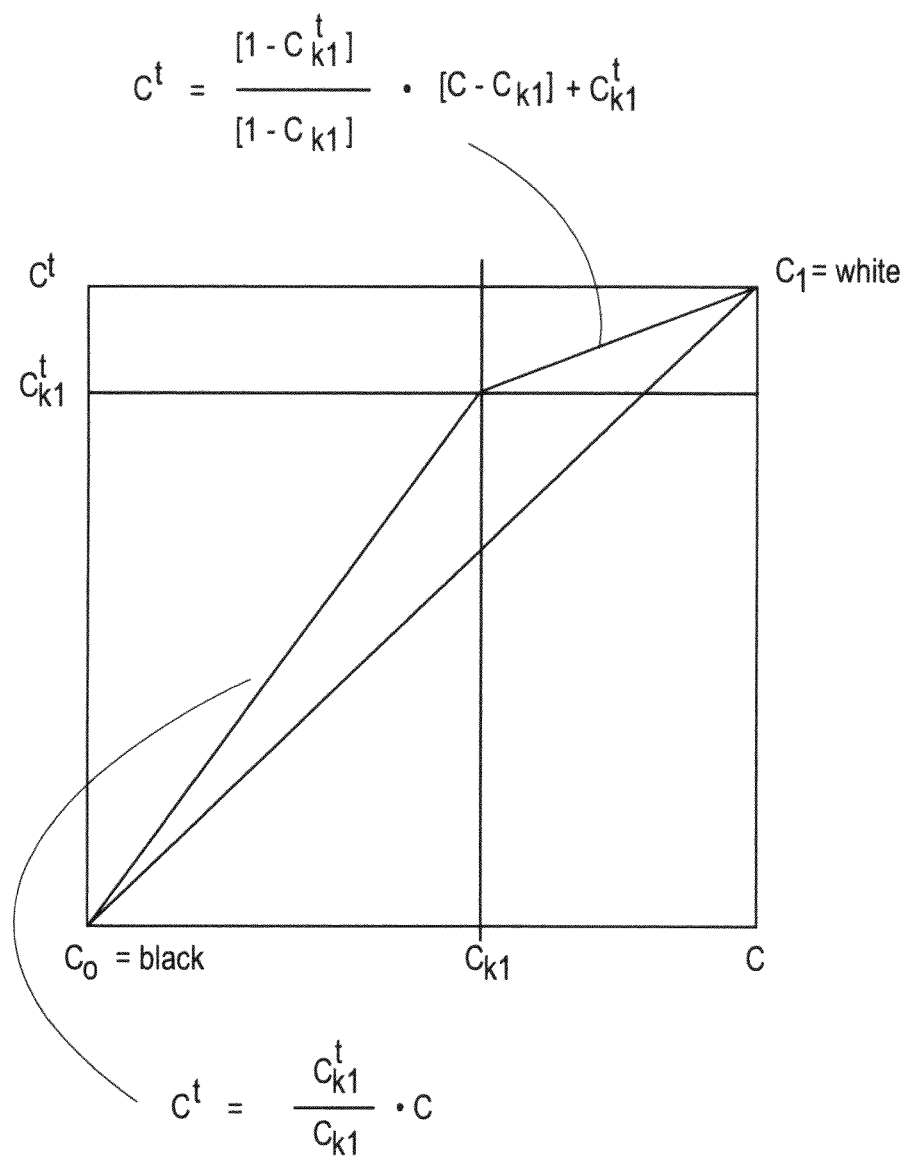
FIG. 7 illustrates a transformation of a displayed image during a gray matching operation in accordance with one embodiment of the disclosures described herein.

FIG. 7 illustrates a transformation of the displayed image for a color C during a gray matching operation in accordance with one embodiment. This transformation will affect all colors of the image except the black and the white levels. Subsequent gray patch matching operations Kn (e.g., blocks 218-222) repeat a gray patch adjustment for the next gray patch that shows the greatest color difference between the screen and the print among all gray patches. The formula for the general case of Kn corresponds to the linear interpolation between the adjustment of gray patch j−1 and j+1 that is the minimum gray interval including the gray patch Kn, $$C_{kj-1} \leq C_{kn} < C_{kj+1},$$

where the color of Kn is transformed as: $C_{kn} \to C_{kn}^t$

The formula for transforming (e.g., sixth transformation of block 222) the color levels in case of the Kn gray level adjustment is:

$$C^t = \frac{C_{kj+1}^t - C_{kn}^t}{C_{kj+1} - C_{kn}} \cdot (C - C_{kn}) + C_{kn}^t, \text{ if } C_{kn} < C_{kj+1}, \text{ and}$$

$$C^t = \frac{C_{kn}^t - C_{kj-1}^t}{C_{kn} - C_{kj-1}} \cdot (C - C_{kj-1}) + C_{kj-1}^t, \text{ if } C_{kj-1} \leq C_{kn}.$$

Figure 8:
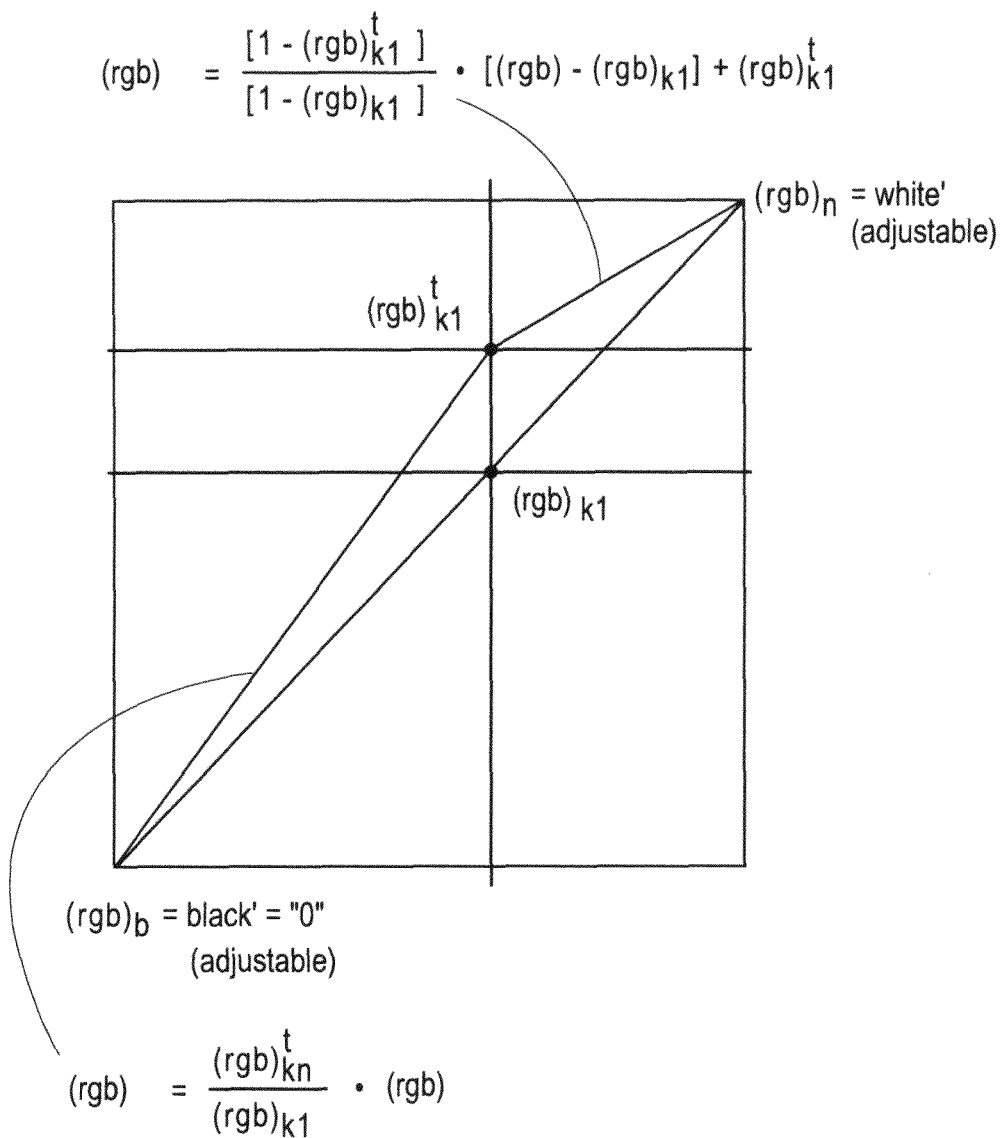
FIG. 8 illustrates the transformation of the displayed image illustrated in FIG. 7 during a gray matching operation in accordance with another embodiment of the disclosures described herein.

FIG. 8 illustrates the transformation of the displayed image illustrated in FIG. 7 during a gray matching operation in accordance with another embodiment. In this case, the color C of FIG. 7 is replaced by the color model red green blue (RGB). The RGB color model is an additive color model in which red, green, and blue light are added together in various ways to reproduce a broad range of colors. The main purpose of the RGB color model is for the sensing, representation, and display of images in electronic systems, such as televisions and computers.

Figure 9:
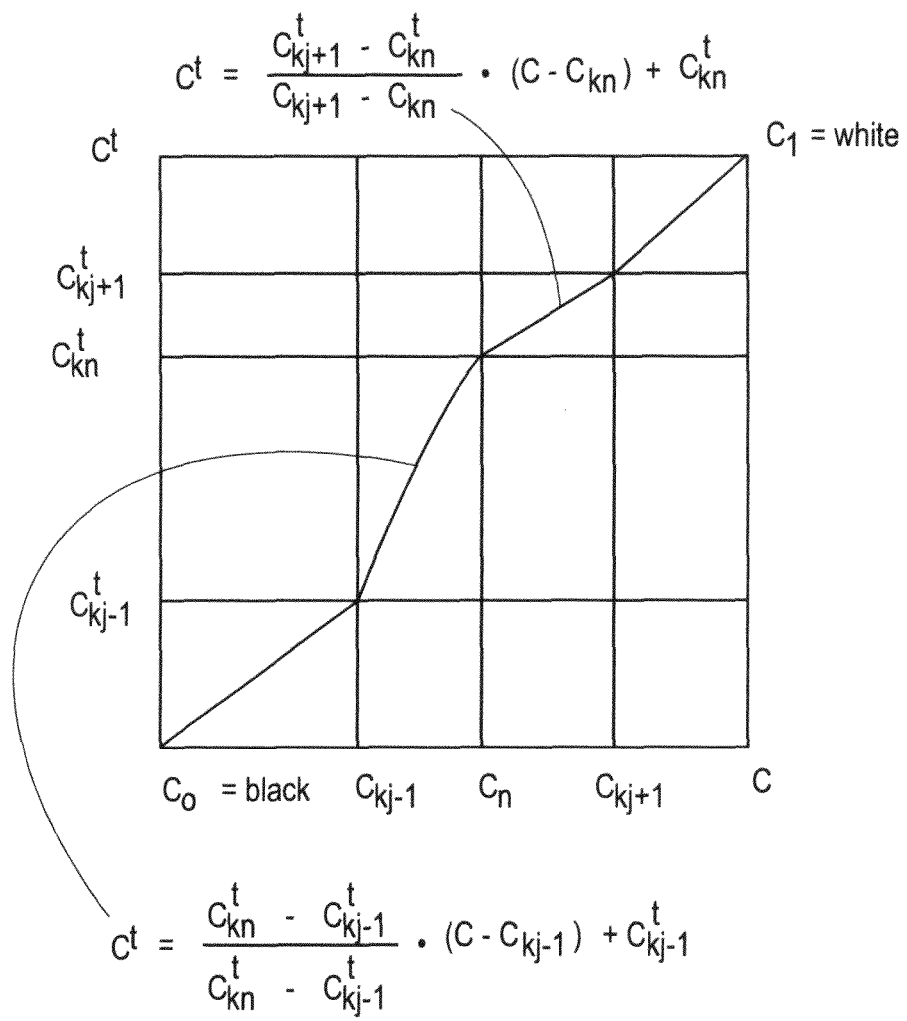
FIG. 9 illustrates a transformation of a displayed image during a subsequent gray matching operation in accordance with one embodiment of the disclosures described herein.

FIG. 9 illustrates a transformation of the displayed image for a color C during a subsequent gray matching operation in accordance with one embodiment. Operation Kn will affect only the color levels in the interval $[C_{kj-1}, C_{kj+1}]$. When the closer to black gray level is $C_{kj+1}^t$ the term $C_{kj-1} = C_{kj-1}^t = 0$ represents black. When the closer to white gray level is $C_{kj-1}$, the term $C_{kj+1} = C_{kj+1}^t = 1$ represents white. Operation Kn can be repeated as many times as it is required until all gray color patches are matched. If an acceptable match of all gray patches is achieved, then a user can proceed to the color patch operation C1. For someone skillful in the art, a more sophisticated procedure of interpolation may be used, for example spline interpolation or polynomial interpolation for computing the transformed color values based on the transformed gray level values.

Figure 10:
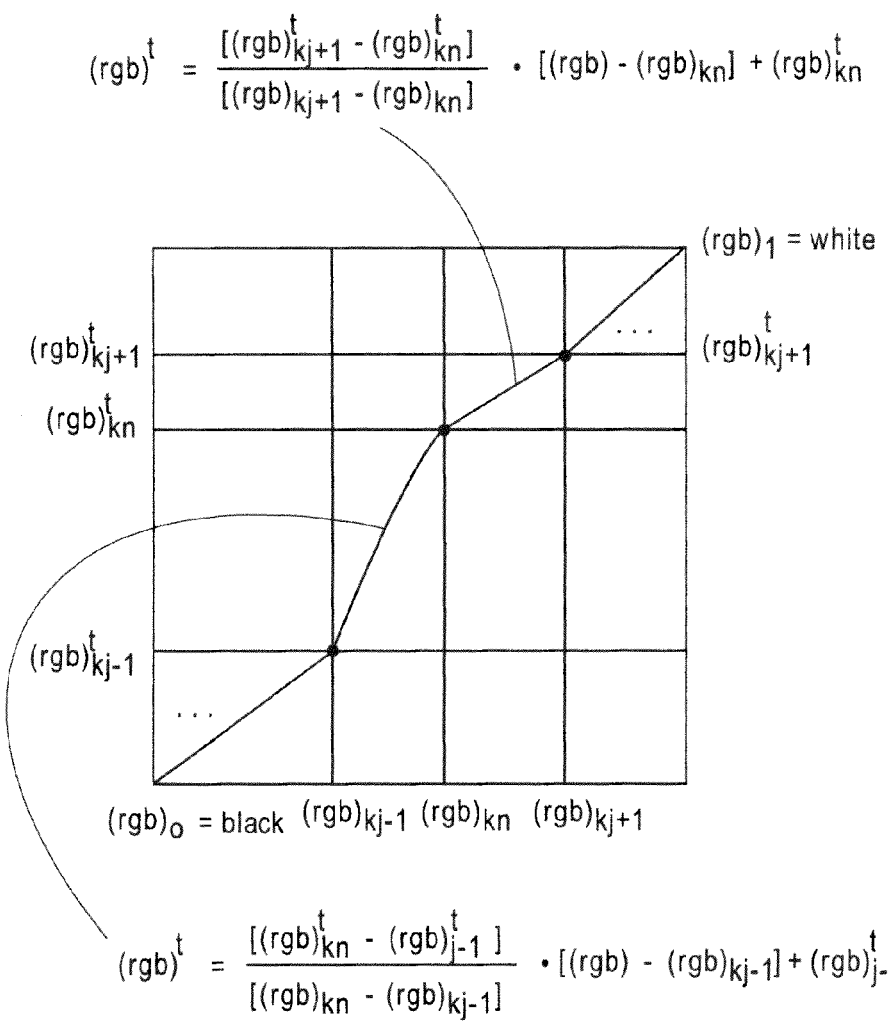
FIG. 10 illustrates the transformation of the displayed image illustrated in FIG. 9 during a subsequent gray matching operation in accordance with another embodiment of the disclosures described herein.

FIG. 10 illustrates the transformation of the displayed image illustrated in FIG. 9 during a subsequent gray matching operation in accordance with another embodiment. In this case, the color C of FIG. 9 is replaced by the RGB color model.

Color patch matching operations (e.g., blocks 224-238) are used for matching the color patches. These operations are labeled C1, . . . , Cn. More precisely, in one embodiment, a color operation is performing in the following way:

1. Identify the displayed color patch $C_n$ that induces the most objectionable color differences in the test image in the available color patches of the printed test chart.

2. Adjust the displayed color $C_n$ until the best match to the printed color patch is found. Let that new displayed color be denoted by $C_n^t$.
3. Transform (e.g., seventh transformation at blocks 228 and 236) the test chart image using the new transformed color $C_n^t$. For every color C in the image,
   a. find the minimum triangle/tetrahedron formed by the white, black, the previously adjusted colors $C_{kn}$ and $C_n$ that contains the color C. Let that tetrahedron be $C_{t1}$, $C_{t2}$, $C_{t3}$, $C_{t4}$.
   b. find the weights w1-4 satisfying the relationship $$C = w_1 \cdot C_{t1} + w_2 \cdot C_{t2} + w_3 \cdot C_{t3} + w_4 \cdot C_{t4}.$$

c. compute new color $C_n^t$ using the following formula:

$$C^t = w_1 \cdot C_{t1}^t + w_2 \cdot C_{t2}^t + w_3 \cdot C_{t3}^t + w_4 \cdot C_{t4}^t$$

4. repeat operations 1-3 until a satisfactory visual color match is found for all color patches.

In the case of matching a custom image only, if the custom image does not contain the white or black colors, then the white and black matching operations may be skipped. For extreme cases when the target image consists of some solid colors, the matching can be performed directly on those colors, starting from the most visually different colors to the last color or to the acceptable color match threshold.

In the foregoing specification, the disclosure has been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method for matching a source profile to a destination profile, comprising:
   providing a destination test chart and a corresponding first source test chart, each test chart comprising a plurality of corresponding color patches;
   applying a first transformation to the source profile in response to receiving an input for visually matching an adjustable white color patch of a display of the source test chart to a white color patch of the destination test chart, said first transformation adjusting the source profile to substantially match the destination profile without a color measuring instrument;
   progressively generating, based on the first transformation that adjusts the source profile, a second source test chart comprising one or more modified color patches compared to color patches of the first source test chart;
   applying a second transformation to the source profile in response to visually matching an adjustable black color patch of the display of the source test chart to a black color patch of the destination test chart, said second transformation further adjusting the source profile to substantially match the destination profile;
   progressively generating, based on the second transformation that further adjusts the source profile, a third source test chart comprising a plurality of modified color patches, wherein all color patches except for white color patches are modified compared to the color patches of the second source test chart;
   visually selecting, from a displayed sequence of gray patches of the third source test chart, a gray patch with a greatest visual mismatch in comparison to a corresponding sequence of gray patches of the destination test chart;
   selecting a reference gray level that is between the selected displayed gray patch and the corresponding selected gray patch of the destination test chart having the greatest visual mismatch; and
   progressively generating a fourth source test chart having all color patches, except for white and black, modified compared to the third source test chart based on applying a third transformation to the source profile for values greater than the reference gray level and a fourth transformation for values less than the reference gray level.

2. The method of claim 1 further comprising:
   deriving a link profile between the adjusted source profile and the destination profile.

3. The method of claim 1, wherein the reference gray level is a first reference gray level, the method further comprising:
   visually selecting a displayed gray patch of a sequence of gray patches of the fourth source test chart with a greatest visual mismatch in comparison to a corresponding sequence of gray patches of the destination test chart;
   selecting a second reference gray level that is between the selected displayed gray patch and the corresponding selected gray patch of the destination test chart having the greatest visual mismatch; and
   progressively generating a fifth source test chart based on applying a fifth transformation.

4. The method of claim 3 further comprising:
   visually selecting a displayed predefined color patch of a sequence of color patches of the fifth source test chart with a greatest visual mismatch in comparison to a corresponding sequence of predefined color patches of the destination test chart;
   adjusting the selected displayed color patch until a best match occurs with respect to the corresponding color patch of the destination test chart;
   progressively generating a sixth source test chart based on applying a sixth transformation; and
   repeating the above operations until an acceptable color match is found for all predefined color patches.

5. The method of claim 4 further comprising:
   visually selecting a displayed custom color patch of a sequence of color patches of the first source test chart with a greatest visual mismatch in comparison to a corresponding sequence of custom color patches of the destination test chart;
   adjusting the selected displayed custom color patch until a best match occurs with respect to the corresponding custom color patch of the destination test chart;
   progressively generating a seventh source test chart based on applying the sixth transformation; and
   if necessary repeating the above operations until an acceptable color match is found for all custom color patches.

6. The method of claim 5, wherein the seventh source test chart is a custom color chart for adjusting the destination profile and source profile with respect to a specific target image having a set of custom color patches defined by a user or with a color quantization program.

7. The method of claim 2, wherein deriving the link profile between the adjusted source profile and the destination profile is based on the adjustments to the source test charts that compensate for differences between source and destination calibrations and differences in color induced by one or more viewing conditions.

8. The method of claim 1, wherein adjusting the source profile to substantially match the destination profile occurs without an instrument in substantially any ambient lighting condition.

9. A machine readable non-transitory medium storing executable program instructions which when executed cause a data processing system to perform a method comprising:

provviding a destination test chart and a corresponding first source test chart, each test chart comprising a plurality of corresponding color patches;

applying a first transformation to a source profile in response to receiving an input for visually matching an adjustable white color patch of a display of the source test chart to a white color patch of the destination test chart, said first transformation adjusting the source profile to substantially match a destination profile without a color measuring instrument;

progressively generating, based on the first transformation that adjusts the source profile, a second source test chart comprising one or more modified color patches compared to color patches of the first source test chart;

applying a second transformation to the source profile in response to visually matching an adjustable black color patch of the display of the source test chart to a black color patch of the destination test chart, said second transformation further adjusting the source profile to substantially match the destination profile;

progressively generating, based on the second transformation that further adjusts the source profile, a third source test chart comprising a plurality of modified color patches, wherein all color patches except for white color patches are modified compared to the color patches of the second source test chart;

visually selecting, from a displayed sequence of gray patches of the third source test chart, a gray patch with a greatest visual mismatch in comparison to a corresponding sequence of gray patches of the destination test chart;

selecting a reference gray level that is between the selected displayed gray patch and the corresponding selected gray patch of the destination test chart having the greatest visual mismatch; and progressively generating a fourth source test chart having all color patches, except for white and black, modified compared to the third source test chart based on applying a third transformation to the source profile for values greater than the reference gray level and a fourth transformation for values less than the reference gray level.

10. The non-transitory medium of claim 9, wherein the reference gray level is a first reference gray level, wherein the method further comprises:

visually selecting a displayed gray patch of a sequence of gray patches of the fourth source test chart with a greatest visual mismatch in comparison to a corresponding sequence of gray patches of the destination test chart;

selecting a second reference gray level that is between the selected displayed gray patch and the corresponding selected gray patch of the destination test chart having the greatest visual mismatch; and progressively generating a fifth source test chart based on applying a sixth fifth transformation.

11. The non-transitory medium of claim 10, wherein the method further comprises:

visually selecting a displayed predefined color patch of a sequence of color patches of the fifth source test chart with a greatest visual mismatch in comparison to a corresponding sequence of color patches of the destination test chart;

adjusting the selected displayed color patch until a best match occurs with respect to the corresponding color patch of the destination test chart;

progressively generating a sixth source test chart based on applying a sixth transformation; and repeating the above operations until an acceptable color match is found for all color patches.

12. A data processing system, comprising:

a display coupled to a bus;

a memory coupled to the bus with the memory configured to store one or more programs and data for a display profile associated with the display;

a first displayed test chart with color patches; and a processor coupled to the bus, said processor (1) to send a command to a printer to print the first displayed test chart to form a printed test chart (2) to receive an input to adjust the display profile to substantially match a printer profile in response to a first visual matching of an adjustable white color patch of the first displayed test chart to at least one corresponding white color patch of the printed test chart, wherein the display profile is adjusted to substantially match the printer profile without a color measuring instrument (3) to progressively generate a second displayed test chart having modified color patches compared to the first displayed test chart based on applying a first transformation to the display profile in response to the first visual matching of the white color patch, (4) to receive an input indicating a second visual matching of an adjustable black color patch of the display to a black color patch of the printed test chart, (5) to progressively generate a third source test chart based on applying a second transformation to the display profile in response to the second visual matching of the black color patch, (6) to receive an input indicating a visual selection of a displayed gray patch of a sequence of gray patches of the third displayed test chart, said selected gray patch having a greatest visual mismatch in comparison to a corresponding sequence of gray patches of the printed test chart, (7) to generate a reference gray level that is between the selected gray patch having the greatest visual mismatch to the corresponding gray patch of the printed test chart, (8) to progressively generate a fourth source test chart based on applying a third transformation to the display profile for values greater than the reference gray level and a fourth transformation for values less than the reference gray level, and (9) to derive a link profile between the adjusted display profile and the printer profile.

13. The data processing system of claim 12, wherein the display profile is adjusted to substantially match the printer profile without an instrument in substantially any ambient lighting condition.

14. A method for matching a source profile to a destination profile, comprising:

providing a destination test chart and a corresponding first source test chart, each test chart having one or more corresponding color patches;

adjusting the source profile to substantially match the destination profile in response to receiving an input for visually matching an adjustable white color patch of a display of the source to a white color patch of the destination test chart; and progressively generating a second source test chart having modified color patches compared to the first source test chart based on applying a first transformation to the source profile in response to visually matching the white color patch, wherein adjusting the source profile to substantially match the destination profile further comprises the following progressive matching of color patches:

visually matching an adjustable black color patch of the display of the source to a black color patch of the destination test chart;
progressively generating a third source test chart having modified all color patches, except for white, compared to the second source test chart based on applying a second transformation to the source profile in response to visually matching the black color patch; and
visually selecting a displayed gray patch of a sequence of gray patches of the third source test chart with a greatest visual mismatch in comparison to a corresponding sequence of gray patches of the destination test chart.

15. The method of claim 14 further comprising:
selecting a first reference gray level that is between the selected displayed gray patch and the corresponding selected gray patch of the destination test chart having the greatest visual mismatch;
progressively generating a fourth source test chart having modified all color patches, except for white and black, compared to the third source test chart based on applying a third transformation to the source profile for values greater than the reference gray level and a fourth transformation for values less than the reference gray level;
visually selecting a displayed gray patch of a sequence of gray patches of the fourth source test chart with a greatest visual mismatch in comparison to a corresponding sequence of gray patches of the destination test chart;
selecting a second reference gray level that is between the selected displayed gray patch and the corresponding selected gray patch of the destination test chart having the greatest visual mismatch; and
progressively generating a fifth source test chart based on applying a fifth transformation.

16. The method of claim 15 further comprising:
visually selecting a displayed predefined color patch of a sequence of color patches of the fifth source test chart with a greatest visual mismatch in comparison to a corresponding sequence of predefined color patches of the destination test chart;
adjusting the selected displayed color patch until a best match occurs with respect to the corresponding color patch of the destination test chart;
progressively generating a sixth source test chart based on applying a sixth transformation; and
repeating the above operations until an acceptable color match is found for all predefined color patches.

17. The method of claim 16 further comprising:
visually selecting a displayed custom color patch of a sequence of color patches of the first source test chart with a greatest visual mismatch in comparison to a corresponding sequence of custom color patches of the destination test chart;
adjusting the selected displayed custom color patch until a best match occurs with respect to the corresponding custom color patch of the destination test chart;
progressively generating a seventh source test chart based on applying the sixth transformation; and
if necessary repeating the above operations until an acceptable color match is found for all custom color patches, wherein the seventh source test chart is a custom color chart for adjusting the destination profile and source profile with respect to a specific target image having a set of custom color patches defined by a user or with a color quantization program.

18. A machine readable non-transitory medium storing executable program instructions which when executed cause a data processing system to perform a method comprising:
providing a destination test chart and a corresponding first source test chart, each test chart having one or more corresponding color patches;
adjusting a source profile to substantially match a destination profile in response to receiving an input for visually matching an adjustable white color patch of a display of the source to a white color patch of the destination test chart; and
progressively generating a second source test chart having modified color patches compared to the first source test chart based on applying a first transformation to the source profile in response to visually matching the white color patch, wherein adjusting the source profile to substantially match the destination profile further comprises the following progressive matching of color patches:
visually matching an adjustable black color patch of the display of the source to a black color patch of the destination test chart;
progressively generating a third source test chart having modified all color patches, except for white, compared to the second source test chart based on applying a second transformation to the source profile in response to visually matching the black color patch; and
visually selecting a displayed gray patch of a sequence of gray patches of the third source test chart with a greatest visual mismatch in comparison to a corresponding sequence of gray patches of the destination test chart.

19. The non-transitory medium of claim 18, wherein the method further comprises:
selecting a first reference gray level that is between the selected displayed gray patch and the corresponding selected gray patch of the destination test chart having the greatest visual mismatch;
progressively generating a fourth source test chart having modified all color patches, except for white and black, compared to the third source test chart based on applying a third transformation to the source profile for values greater than the reference gray level and a fourth transformation for values less than the reference gray level;
visually selecting a displayed gray patch of a sequence of gray patches of the fourth source test chart with a greatest visual mismatch in comparison to a corresponding sequence of gray patches of the destination test chart;
selecting a second reference gray level that is between the selected displayed gray patch and the corresponding selected gray patch of the destination test chart having the greatest visual mismatch; and
progressively generating a fifth source test chart based on applying a fifth transformation.

20. The non-transitory medium of claim 19, wherein the method further comprises:
visually selecting a displayed predefined color patch of a sequence of color patches of the fifth source test chart with a greatest visual mismatch in comparison to a corresponding sequence of color patches of the destination test chart;
adjusting the selected displayed color patch until a best match occurs with respect to the corresponding color patch of the destination test chart;
progressively generating a sixth source test chart based on applying a sixth transformation; and
repeating the above operations until an acceptable color match is found for all color patches.

* * * * *